3,763,255
DEHYDROGENATION METHOD AND MULTICOMPONENT CATALYST FOR USE THEREIN
John C. Hayes, Palatine, Ill., assignor to Universal Oil Products Company, Des Plaines, Ill.
No Drawing. Continuation-in-part of application Ser. No. 38,572, May 18, 1970. This application Feb. 1, 1972, Ser. No. 222,675
Int. Cl. C07c 5/18
U.S. Cl. 260—668 D
8 Claims

ABSTRACT OF THE DISCLOSURE

Dehydrogenatable hydrocarbons are dehydrogenated by contacting them at dehydrogenation conditions with a catalytic composite comprising a combination of catalytically effective amounts of a platinum component, an iridium component and an alkali or alkaline earth metal component with a porous carrier material in a manner such that the platinum and iridium components are uniformly dispersed in the carrier material and are present therein in amounts selected to result in an atomic ratio of iridium to platinum of about 0.5:1 to about 1.5:1. Moreover, the catalytic composite is prepared by: (a) forming a sulfur-free composite of platinum, iridium and an alkali or alkaline earth metal with a porous carrier material; (b) subjecting the resulting composite to a substantially sulfur-free oxidation step; and (c) contacting the resulting oxidized composite with a sulfur-free hydrogen stream at conditions selected to result in the reduction of substantially all of the platinum and iridium components to the corresponding elemental metallic state.

CROSS-REFERENCES TO RELATED APPLICATIONS

This application is a continuation-in-part of my prior, copending application Ser. No. 38,572 which was filed on May 18, 1970.

The subject of the present invention is, broadly an improved method for dehydrogenating a dehydrogenatable hydrocarbon to produce a hydrocarbon product containing the same number of carbon atoms but fewer hydrogen atoms. In another aspect, the present invention involves a method of dehydrogenating normal paraffin hydrocarbons containing 4 to 30 carbon atoms per molecule to the corresponding normal mono-olefin with minimum production of side products. In yet another aspect, the present invention relates to a novel catalytic composite comprising a combination of catalytically effective amounts of a platinum component, an iridium component and an alkali or alkaline earth component with a porous carrier material, which composite has highly beneficial characteristics of activity, selectivity, and stability when it is employed in the dehydrogenation of dehydrogenatable hydrocarbons such as aliphatic hydrocarbons, naphthene hydrocarbons, and alkylaromatic hydrocarbons.

The conception of the present information followed from my search for a novel catalytic composite possessing a hydrogenation-dehydrogenation function, a controllable cracking function, and superior conversion, selectivity and stability characteristics when employed in hydrocarbon conversion processes that have traditionally utilized dual-function catalytic composites. In my prior application, I disclosed a significant finding with respect to a catalytic composite meeting these requirements. More specifically, I determined that an iridium component can be utilized under certain conditions, to beneficially interact with the platinum component of a dual-function catalyst with a resulting marked improvement in the performance of such a catalyst in a hydrocarbon conversion process of the type that has traditionally utilized platinum-containing catalysts. As is more fully explained hereinafter, my findings on the conditions necessary to achieve beneficial interaction of iridium with platinum in this type of catalyst were associated with the following factors: (1) distribution of the platinum and iridium components in the support, (2) atomic ratio of iridium to platinum, (3) oxidation state of the iridium and platinum components and (4) method of preparation of the composite. Now I have ascertained that this type of catalyst can be utilized in a dehydrogenation process to dehydrogenate dehydrogenatable hydrocarbons in a highly effective and efficient manner if an alkali or alkaline earth metal component is combined therewith in a catalytically effective amount. Thus the present invention is essentially a combination of the specially prepared platinum-iridium catalytic composite disclosed in my prior application with an alkali or alkaline earth metal component and the use of the resulting catalyst in the dehydrogenation of dehydrogenatable hydrocarbons.

The dehydrogenation of dehydrogenatable hydrocarbons is an important commercial process because of the great and expanding demand for dehydrogenated hydrocarbons for use in the manufacture of various chemical products such as detergents, plastics, synthetic rubbers, pharmaceutical products, high octane gasoline, perfumes, drying oils, ion-exchange resins, and various other products well known to those skilled in the art. One example of this demand is in the manufacture of high octane gasoline by using $C_3$ and $C_4$ mono-olefins to alkylate isobutane. Another example of this demand is in the area of dehydrogenation of normal paraffin hydrocarbons to produce normal mono-olefins having 4 to 30 carbon atoms per molecule. These normal mono-olefins can, in turn, be utilized in the synthesis of a vast number of other chemical products. For example, derivatives of normal mono-olefins have become of substantial importance to the detergent industry where they are utilized to alkylate an aromatic, such as benzene, with subsequent transformation of the product arylalkane into a wide variety of biodegradable detergents such as the alkylaryl sulfonate type of detergent which is most widely used today for household, industrial, and commercial purposes. Still another large class of detergents produced from these normal mono-olefins are the oxyalkylated phenol derivatives in which the alkyl phenol base is prepared by the alkylation of phenol with these normal mono-olefins. Still other types of detergents produced from these normal mono-olefins are the biodegradable alkylsulfates formed by the direct sulfation of the normal mono-olefin. Likewise, the olefin can be subjected to direct sulfonation with sodium bisulfite to make biodegradable alkylsulfonates. As a further example, these mono-olefins can be hydrated to produce alcohols which then, in turn, can be used to produce plasticizers and/or synthetic lube oils.

Regarding the use of products made by the dehydrogenation of alkylaromatic hydrocarbons, they find wide application in industries including the petroleum, petrochemical, pharmaceutical, detergent, plastic industries, and the like. For example, ethylbenzene is dehydrogenated to produce styrene which is utilized in the manufacture of polystyrene plastics, styrene-butadiene rubber, and the like products. Isopropylbenzene is dehydrogenated to form alpha-methylstyrene which, in turn, is extensively used in polymer formation and in the manufacture of drying oils, ion exchange resins, and the like materials.

Responsive to this demand for these dehydrogenation products, the art has developed a number of alternative methods to produce them in commercial quantities. One method that is widely utilized involves the selective dehydrogenation of a dehydrogenatable hydrocarbon by contacting the hydrocarbon with a suitable catalyst at dehydrogenation conditions. As is the case with most catalytic procedures, the principal measure of effectiveness for this dehydrogenation method involves the ability to perform its intended function with minimum interference of side reactions for extended periods of time. The analytical terms used in the art to broadly measure how well a particular catalyst performs its intended functions in a particular hydrocarbon conversion reaction are activity, selectivity, and stability, and for purposes of discussion here these terms are generally defined for a given reactant as follows: (1) activity is a measure of the catalyst's ability to convert the hydrocarbon reactant into products at a specified severity level where severity level means the conditions used—that is, the temperature, pressure, contact time, and presence of diluents such as $H_2$; (2) selectivity usually refers to the amount of desired product or products obtained relative to the amount of the reactant charged or converted; (3) stability refers to the rate of change with time of the activity and selectivity parameters—obviously the smaller rate implying the more stable catalyst. More specifically, in a dehydrogenation process, activity commonly refers to the amount of conversion that takes place for a given dehydrogenatable hydrocarbon at a specified severity level and is typically measured on the basis of disappearance of the dehydrogenatable hydrocarbon; selectivity is typically measured by the amount, calculated on a mole percent of converted dehydrogenatable hydrocarbon basis, of the desired dehydrogenated hydrocarbon obtained at the particular severity level; and stability is typically equated to the rate of change with time of activity as measured by disappearance of the dehydrogenatable hydrocarbon and of selectivity as measured by the amount of desired hydrocarbon produced. Accordingly, the major problem facing workers in the hydrocarbon dehydrogenation art is the development of a more active and selective catalytic composite that has good stability characteristics.

I have now found a catalytic composite which possesses improved activity, selectivity, and stability when it is employed in a process for the dehydrogenation of dehydrogenatable hydrocarbons. In particular, I have determined that a catalyst, comprising a combination of catalytically effective amounts of a platinum component, an iridium component and an alkali or alkaline earth metal component with a porous, refractory carrier material, can enable the performance of a dehydrogenation process to be substantially improved if the catalyst meets certain essential requirements. The first of these requirements has to do with the distribution of the platinum and iridium components in the associated carrier material and my finding on this matter is that it is essential that these metallic components be uniformly dispersed in the carrier material. By the use of the expression "uniform dispersion" I mean to cover the situation where the concentration of these metallic components is approximately the same in any divisable portion of the carrier material and to distinguish from the situation where these metallic ingredients are concentrated on the surface of the carrier material. A second requirement for this beneficial interaction pertains to the atomic ratio of iridium to platinum which is utilized in the catalyst and it is my observation that the beneficial interaction of iridium with platinum is obtained in a relatively narrow atomic range corresponding to about 0.5:1 to about 1.5 atoms of iridium per atom of platinum, with best results achieved at an atomic ratio of 1:1. Another requirement relates to the oxidation states of the platinum and iridium components and it is my finding that substantially all of these components should be present in the elemental metallic state prior to the use of the catalyst for the dehydrogenation of hydrocarbons. Yet another essential limitation on this catalyst is associated with its method of preparation and my finding on this aspect of the subject is that it is essential that the catalyst be maintained in a sulfur-free state until the platinum and iridium components are reduced to the elemental state in a prereduction step before use of the catalyst in the dehydrogenation of hydrocarbons; that is, it is essential to exclude sulfur from contact with the catalyst during the portion of its preparation procedure when these metallic components are in a positive oxidation state. In summary, I have found a catalyst which is particularly useful in the dehydrogenation of long chain normal paraffins with minimization of side reactions such as skeletal isomerization, aromatization and cracking.

It is, accordingly, one object of the present invention to provide a novel method for the dehydrogenation of dehydrogenatable hydrocarbons utilizing a catalytic composite comprising catalytically effective amounts of a platinum component, an iridium component and an alkali or alkaline earth metal component combined with a porous carrier material. A second object is to provide a novel catalytic composite having superior performance characteristics when utilized in a dehydrogenation process. Another object is to provide an improved method for the dehydrogenation of normal paraffin hydrocarbons to produce normal mono-olefins which method minimizes undesirable side reactions such as cracking, skeletal isomerization, and aromatization.

In brief summary, one embodiment of the present invention involves a method for dehydrogenating a dehydrogenatable hydrocarbon which comprises contacting the hydrocarbon with a catalytic composite containing a platinum component, an iridium component and an alkali or alkaline earth metal component combined with a porous carrier material at dehydrogenation conditions. The catalytic composite utilized contains the platinum and iridium components in amounts selected to result in an atomic ratio of iridium to platinum of about 0.5:1 to about 1.5:1 and these components are uniformly dispersed in the carrier material. Moreover, this composite is prepared by the steps of: (a) forming a sulfur-free composite of platinum, iridium and an alkali or alkaline earth metal with a porous carrier material in a manner selected to result in a uniform dispersion of the iridium and platinum components in the carrier materials; (b) subjecting the resulting composite to contact with a sulfur-free, oxygen-containing gas stream at oxidation conditions selected to oxidize both the platinum and iridium components; and thereafter (c) contacting the resulting oxidized composite with a sulfur-free hydrogen stream at reduction conditions selected to reduce both the platinum and iridium components to the elemental metallic state.

A second embodiment relates to the dehydrogenation method described in the first embodiment wherein the dehydrogenatable hydrocarbon is an aliphatic compound containing 2 to 30 carbon atoms per molecule.

A third embodiment pertains to a catalytic composite comprising a combination of catalytically effective amounts of a platinum component, an iridium component and an alkali or alkaline earth metal component with an alumina carrier material in amounts sufficient to result in a composite containing, on an elemental basis, about 0.01 to about 2 wt. percent platinum, about 0.1 to about 2 wt percent iridium and about 0.01 to about 5 wt. percent alkali or alkaline earth metal. Moreover, this composite meets the atomic ratio, metal dispersion and method of preparation limitations previously stated in the first embodiment.

Another embodiment pertains to a method for dehydrogenating a dehydrogenatable hydrocarbon which comprises contacting the hydrocarbon with the catalytic composite described in the third embodiment at dehydrogenation conditions.

Other objects and embodiments of the present invention involve specific details regarding essential and preferred catalytic ingredients, preferred amounts of ingredients, suitable methods of composite preparation, suitable dehydrogenatable hydrocarbons, operating conditions for use in the dehydrogenation process, and the like particulars.

These are hereinafter given in the following detailed discussion of each of these facets of the present invention.

Regarding the dehydrogenatable hydrocarbon that is subjected to the method of the present invention, it can, in general, be an organic compound having 2 to 30 carbon atoms per molecule and containing at least 1 pair of adjacent carbon atoms having hydrogen attached thereto. That is, it is intended to include within the scope of the present invention, the dehydrogenation of any organic compound capable of being dehydrogenated to produce products containing the same number of carbon atoms but fewer hydrogen atoms, and capable of being vaporized at the dehydrogenation temperatures used herein. More particularly, suitable dehydrogenatable hydrocarbons are: aliphatic compounds containing 2 to 30 carbon atoms per molecule, alkylaromatic hydrocarbons where the alkyl group contains 2 to 6 carbon atoms, and naphthenes or alkyl-substituted naphthenes. Specific examples of suitable dehydrogenatable hydrocarbons are: (1) alkanes such as ethane, propane, n-butane, isobutane, n-pentane, isopentane, n-hexane, 2-methylhexane, 2-methylpentane, 2,2-dimethylbutane, n-heptane, 2-methylhexane, 2,2,3-trimethylbutane, and the like compounds; (2) naphthenes such as cyclopentane, cyclohexane, methylcyclopentane, ethylcyclopentane, n-propylcyclopentane, 1,3-dimethylcyclohexane, and the like compounds; and (3) alkylaromatics such as ethylbenzene, n-butylbenzene, 1,3,5-triethylbenzene, isopropylbenzene, isobutylbenzene, ethylnaphthalene, and the like compounds.

In a preferred embodiment, the dehydrogenatable hydrocarbon is a normal paraffin hydrocarbon having about 4 to about 30 carbon atoms per molecule. For example, normal paraffin hydrocarbons containing about 10 to 18 carbon atoms per molecule are dehydrogenated by the subject method to produce the corresponding normal mono-olefin which can, in turn, be used to alkylate benzene and sulfonated to make alkylbenzene sulfonate detergents having superior biodegradability. Likewise, n-alkanes having 10 to 18 carbon atoms per molecule can be dehydrogenated to the corresponding normal mono-olefin which, in turn, can be sulfated or sulfonated to make excellent detergents. Similarly, n-alkanes having 6 to 10 carbon atoms can be dehydrogenated to form the corresponding mono-olefin which can, in turn, be hydrated to produce valuable alcohols. Preferred feed streams for the manufacture of detergent intermediates contain a mixture of 4 or 5 adjacent normal paraffin homologues such as $C_{10}$ to $C_{13}$, $C_{11}$ to $C_{14}$, $C_{11}$ to $C_{15}$, and the like mixtures.

An essential feature of the present invention involves the use of a catalytic composite comprising a combination of catalytically effective amounts of a platinum component, an iridium component and an alkali or alkaline earth metal component with a porous carrier material in a manner such that the previously mentioned limitations on metals dispersion in support, atomic ratio of iridium to platinum and method of preparation are met.

Considering first the porous carrier material utilized in the present invention, it is preferred that the material be a porous, adsorptive, high-surface area support having a surface area of about 25 to about 500 m.$^2$/g. The porous carrier material should be relatively refractory to the conditions utilized in the dehydrogenation process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgas clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc. (5) crystalline aluminosilicates such as naturally occurring or synthetically prepared mordenite and/or faujasite, either in the hydrogen form or in a form which has been treated with multivalent cations; and, (6) combinations of one or more elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma- or eta-alumina giving best results. In addition, in some embodiments the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.7 g./cc. and surface area characteristics such that the average pore diameter is about 20 to 3000 angstroms, the pore volume is about 0.1 to about 1 ml./g. and the surface area is about 100 to about 500 m.$^2$/g. In general, best results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 ml./g., and a surface area of about 175 m.$^2$/g.

The preferred alumina carrier material may be prepared in any suitable manner and may be synthetically prepared or natural occurring. Whatever type of aluminia is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogen spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination or oxidation procedure at a temperature of about 850° F. to about 1300° F. for a time period of about 1 to 20 hours. This treatment affects conversion of the alumina hydrogel to the corresponding crystalline gamma-alumina. See the teachings of U.S. Pat. No. 2,620,314 for additional details regarding this oil drop method.

One essential ingredient of the subject catalyst is the platinum component. The platinum component may exist within the final catalytic composite as a compound such as a sulfide, oxide, oxychloride or as an elemental metal, or in chemical combination with one or more of the other ingredients of the present composite. Typically, best results are obtained with this component when it is present in the elemental state, although in some cases it may be present as platinum sulfide. Generally, the amount of the platinum component present in the final catalytic composite is small compared to the quantities of the other components combined therewith. In fact, this component generally comprises about 0.01 to about 2 wt. percent of the final catalytic composite, calculated on an elemental basis. Excellent results are obtained when the catalyst contains about 0.05 to about 1 wt. percent of the platinum. The herein disclosed procedure for preparing the instant catalyst is believed to result in a composite having this component in the elemental state or in a sulfide state.

This platinum component may be incorporated in the catalytic composite in any manner known to the art which results in a uniform dispersion of this component throughout the carrier material. One acceptable procedure involves cogelling, or coprecipitating this component during the formation of the preferred alumina carrier material by techniques well known to the art. The preferred method of preparing the catalyst involves the utilization of a soluble, decomposable compound of platinum to impregnate the carrier material. For example, this component may be added to the carrier by commingling the latter with a sulfur-free aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, and the like compounds. The utilization of a platinum chloride compound such as chloroplatinic acid, is ordinarily preferred. When this component is added by impregnation, it is essential that hydrogen chloride or the like acid be added to the impregnation solution in order to insure that the metallic component is evenly distributed throughout the carrier material. Generally, the acid should be utilized in an amount corresponding to about 1 to about 20 wt. percent of the carrier material which is impregnated. In addition, it is generally preferred to impregnate the carrier material after it has been calcined in order to minimize the risk of washing away the valuable platinum compound; however, in some cases it may be advantageous to impregnate the carrier material when it is in a gelled state. It is to be noted that it is essential that the incorporation of this component be conducted under sulfur-free conditions so that the resulting composite is free of sulfur.

A second essential ingredient of the present catalytic composite is an iridium component. This component may be present in the final composite as the elemental metal, or in chemical combinations with one or more of the other ingredients of the composite, or as a chemical compound of iridium such as the sulfide, oxide, oxychloride, etc. Generally, best results are obtained when this component is present in the elemental state or in the sulfided state. The iridium component may be utilized in the composite in any amount which is catalytically effective, with the preferred amount being about 0.01 to about 2 wt. percent thereof, calculated on an elemental iridium basis. Typically, best results are obtained with about 0.05 to about 1 wt. percent iridium. According to the present invention, it is essential to select the specific amount of iridium from within this broad weight range as a function of the amount of the platinum component, on an atomic basis, as is explained hereinafter.

The iridium component may be incorporated into the catalytic composite in any manner known to those skilled in the catalyst formulation art which is effective to uniformly distribute the metal throughout the carrier material. In addition, it may be added at any stage of the preparation of the composite—either during preparation of the carrier material or thereafter—and the precise method of incorporation used is not deemed to be critical, provided the desired uniform distribution is obtained. One preferred procedure for incorporating this ingredient into the composite involves cogelling or coprecipitating the iridium component during the preparation of the preferred carrier material, alumina. This procedure usually comprehends the addition of a soluble, decomposable compound of iridium such as iridium tetrachloride to the alumina hydrosol before it is gelled. The resulting mixture is then finished by conventional gelling, aging, drying, and calcination steps as explained hereinbefore. Another preferred way of incorporating this component is an impregnation step wherein the porous carrier material is impregnated with a suitable iridium-containing, sulfur-free solution either before, during, or after the carrier material is calcined. Preferred impregnation solutions are aqueous solutions of water-soluble, decomposable iridium compounds such as iridium tribromide, iridium dichloride, iridium tetrachloride, iridium oxalic acid, iridium sulfate, potassium iridochloride, chloroiridic acid and the like compounds. Best results are ordinarily obtained when the impregnation solution is an aqueous solution of chloroiridic acid or sodium chloroiridate. Like the situation when platinum is impregnated, it is essential that the impregnation also contain sufficient hydrochloric acid or the like acid to enable uniform dispersion of the component in the carrier material. Typically, the acid comprises about 1 to 20 wt. percent of the carrier material which is impregnated. This component can be added to the carrier material, either prior to, simultaneously with, or after the platinum component is combined therewith. Best results are usually achieved when this component is added simultaneously with the platinum component. In fact, excellent results are obtained with a one-step impregnation procedure using an aqueous solution comprising chloroplatinic acid, chloroiridic acid and hydrochloric acid. Again it is important that the incorporation of this component into the composite be conducted under sulfur-free conditions so that the resulting composite is free of sulfur.

Another essential ingredient of the instant composite is an alkali or alkaline earth metal component. More specifically, this component is selected from the group consisting of the alkali metals—cesium, rubidium, potassium, sodium, and lithium—and of the alkaline earth metals—calcium, strontium, barium, and magnesium. This component may exist within the catalytic composite as a relatively stable compound such as the oxide or sulfide or in combination with one or more of the other components of the composite, or in combination with an alumina carrier material such as in the form of a metal aluminate. Since, as is explained hereinafter, the composite containing the alkali or alkaline earth is always calcined or oxidized in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing on an elemental basis, about 0.01 to about 5 wt. percent of the alkali or alkaline earth metal, and more preferably about 0.05 to about 2.5 wt. percent. Best results are ordinarily achieved when this component is a compound of lithium or potassium.

This alkali or alkaline earth component may be combined with the porous carrier material in any manner known to those skilled in the art such as by impregnation, coprecipitation, physical admixture, ion exchange, etc. However, the preferred procedure involves impregnation of the carrier material either before or after it is calcined and either before, during or after the other components are added to the carrier material. Best results are ordinarily obtained when this component is added after the platinum and iridium components because it serves to neutralize the acid used in the preferred impregnation procedure for incorporation of these components. In fact, it is preferred to add the platinum and iridium components, dry and oxidize the resulting composite, then treat the oxidized composite with steam in order to remove residual acidity, and then add this component. Typically, the impregnation of the carrier material is performed by contacting same with a solution of a suitable decomposable compound or salt of the desired alkali or alkaline earth metal. Hence, suitable compounds include the halides, sulfates, nitrates, acetates, carbonates, phosphates, and the like compounds. For example, excellent results are obtained by impregnating the carrier material, after the platinum and iridium components have been combined therewith, with an aqueous solution of lithium nitrate or potassium nitrate.

Regarding the relative amounts of the iridium and platinum components of the subject catalyst, it is an essential feature of the present invention that the amount of the iridium component is selected from the range previously given so that the atomic ratio of iridium to platinum contained in the composite is within the range of about 0.5:1 to about 1.5:1. Best results are believed to be obtained with the instant composite when this ratio is fixed at a value of about 1:1.

Regardless of the details of how the metallic components are incorporated in the carrier material, it is important that suitable precautions be taken during this incorporation procedure so that the resulting composite is free of sulfur. Thereafter, it is another essential feature of the present invention that the resulting composite is subjected to contact with a sulfur-free, oxygen-containing gas stream at oxidation conditions selected to oxidize both the iridium and platinum components. Typically, this involves drying the resulting composite at a temperature of about 200 to 600° F. for about 2 to 24 hours and thereafter subjecting the composite to contact with a sulfur-free gas stream containing about 1 to about 25 mole percent $O_2$ for a period of about ½ to about 10 hours at a temperature of about 700 to 1100° F. effective to convert the platinum and iridium components substantially to the oxide form. When acidic components are present in any of the reagents used to effect incorporation of any of the components of the instant catalyst, it is a preferred practice to subject the resulting composite to a high temperature (i.e., about 500 to 1100° F.) treatment with steam, either before or after the oxidation step described above. The principal objective of this steam treatment step is to remove as much as possible of undesired acidic components such as halogen from the catalyst. For example, in the preferred case where the platinum and iridium components are added to the composite by means of an impregnation solution containing chloroplatinic acid and chloroiridic acid, it is preferred to subject the resulting impregnated composite after the oxidation step described above to a treatment with a gas stream containing steam at a temperature of about 500 to 1100° F. for about 0.5 to about 5 hours in order to remove residual chloride from the catalyst.

Yet another essential feature of the current invention involves a prereduction step in which both the platinum and iridium components are reduced to the elemental state. This step is performed on the oxidized composite from the oxidation step, and must be subsequent to this oxidation step. This step is designed to insure a uniform and finely divided dispersion of the metallic components throughout the gamma-alumina carrier material. The hydrogen stream used as a reducing agent in this step must be sulfur-free. In addition, it is preferred that it be substantially free of water; that is, it should contain less than 20 vol. p.p.m. water. The reducing agent is contacted with the oxidized catalyst at a temperature of about 800° F. to about 1200° F. and for a period of time of about 0.5 to 10 hours or more effective to substantially reduce the platinum and the iridium components to the elemental state. This reduction treatment may be performed in situ as part of a start-up sequence if precautions are taken to predry the plant to a substantially water-free state and if substantially sulfur-free hydrogen is used.

The resulting reduced catalytic composite may, in some cases, be beneficially subjected to a presulfiding operation designed to incorporate in the catalytic composite from about 0.05 to about 0.5 wt. percent sulfur, calculated on an elemental basis. However, it is to be noted that this optional sulfiding step is only to be performed, if at all, after the metallic components are reduced to the elemental state. Preferably, this optional presulfiding treatment takes place in the presence of hydrogen and a suitable sulfur-containing compound such as hydrogen sulfide, lower molecular weight mercaptans, organic sulfides, etc. Typically, this procedure comprises treating the resulting reduced catalyst with a sulfiding gas such as a mixture of hydrogen and hydrogen sulfide having an $H_2S$ to $H_2$ mole ratio of about 0.1:1 at conditions sufficient to effect the desired incorporation of sulfur generally including a temperature ranging from about 50° F. up to about 1100° F. or more. It is generally a good practice to perform this optional presulfiding step under substantially water-free conditions. This step is preferably performed ex situ although it can in many cases be performed successfully in situ during the start-up of the dehydrogenation process and prior to actual contact of hydrocarbon with the prereduced catalyst.

According to the method of the present invention, the dehydrogenatable hydrocarbon is contacted with a catalytic composite of the type described above in a dehydrogenation zone maintained at dehydogenation conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the hydrocarbon feed stream is preheated by any suitable heating means to the desired reaction temperature and then passed into a dehydrogenation zone containing a fixed bed of the catalyst previously characterized. It is, of course, understood that the dehydrogenation zone may be one or more separate reactors with suitable heating means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst, with best results obtained in the vapor phase.

Although hydrogen is the preferred diluent for use in the subject dehydrogenation method, in some cases other art-recognized diluents may be advantageously utilized such as steam, methane, carbon dioxide, and the like diluents. Hydrogen is preferred because it serves the dual-function of not only lowering the partial pressure of the dehydrogenatable hydrocarbon, but also of suppressing the formation of hydrogen-deficient, carbonaceous deposits on the catalytic composite. Ordinarily, hydrogen is utilized in amounts sufficient to insure a hydrogen to hydrocarbon mole ratio of about 1:1 to about 20:1, with best results obtained in the range of 1.5:1 to about 10:1. The hydrogen stream charged to the dehydrogenation zone will typically be recycled hydrogen obtained from the effluent stream from this zone after a suitable hydrogen separation step.

Regarding the conditions utilized in the process of the present invention, these are generally selected from the dehydrogenation conditions well known to those skilled in the art for the particular dehydrogenatable hydrocarbon which is charged to the process. More specifically, suitable conversion temperatures are selected from the range of about 700 to about 1250° F., with a value being selected from the lower portion of this range for the more easily dehydrogenated hydrocarbons such as the long chain normal paraffins and from the higher portion of this range for the more difficultly dehydrogenated hydrocarbons such as propane, butane, and the like hydrocarbons. For example, for the dehydrogenation of $C_6$ to $C_{30}$ normal paraffins, best results are ordinarily obtained at a temperature of about 800 to about 950° F. The pressure utilized is ordinarily selected at a value which is as low as possible consistent with the maintenance of catalyst stability and is usually about 0.1 to about 10 atmospheres, with best results ordinarily obtained in the range of about .5 to about 3 atmospheres. In addition, a liquid hourly space velocity (calculated on the basis of the volume amount, as a liquid, of hydrocarbon charged to the dehydrogenation zone per hour divided by the volume of the catalyst bed utilized) is selected from the range of about 1 to about 40 hr.$^{-1}$, with best results for the dehydrogenation of long chain normal paraffins typically obtained at a relatively high space velocity of about 25 to 35 hr.$^{-1}$.

Regardless of the details concerning the operation of the dehydrogenation step, an effluent stream will be withdrawn therefrom. This effluent will usually contain unconverted dehydrogenatable hydrocarbons, hydrogen, and products of the dehydrogenation reaction. This stream is typically cooled and passed to a hydrogen-separating zone wherein a hydrogen-rich vapor phase is allowed to separate from a hydrocarbon-rich liquid phase. In general, it is usually desired to recover the unreacted dehydrogenatable hydrocarbon from this hydrocarbon-rich liquid phase in order to make the dehydrogenation process economically attractive. This recovery operation can be accomplished in any suitable manner known to the art such as by passing the hydrocarbon-rich liquid phase through a bed of suitable adsorbent material which has the capability to selectively retain the dehydrogenated hydrocarbons contained therein or by contacting same with a solvent having a high selectivity for the dehydrogenated hydrocarbon, or by a suitable fractionation scheme where feasible. In the case where the dehydrogenated hydrocarbon is a mono-olefin, suitable adsorbents having this capability are activated silica gel, activated carbon, activated alumina, various types of specially prepared molecular sieves, and the like adsorbents. In another typical case, the dehydrogenated hydrocarbons can be separated from the unconverted dehydrogenatable hydrocarbons by utilizing the inherent capability of the dehydrogenated hydrocarbons to easily enter into several well known chemical reactions such as alkylation, oligomerization, halogenation, sulfonation, hydration, oxidation, and the like reactions. Irrespective of how the dehydrogenated hydrocarbons are separated from the unreacted hydrocarbons, a stream containing the unreacted dehydrogenatable hydrocarbons will typically be recovered from this hydrocarbon separation step and recycled to the dehydrogenation step. Likewise, the hydrogen phase present in the hydrogen-separating zone will be withdrawn therefrom, a portion of it vented from the system in order to remove the net hydrogen make, and the remaining portion is typically recycled through suitable compressing means to the dehydrogenation step in order to provide diluent hydrogen therefor.

In a preferred embodiment of the present invention wherein long chain normal paraffin hydrocarbons are dehydrogenated to the corresponding normal mono-olefins, a preferred mode of operation of this hydrocarbon recovery step involves an alkylation reaction. In this mode, the hydrocarbon-rich liquid phase withdrawn from the hydrogen-separating zone is combined with a stream containing an alkylatable aromatic and the resulting mixture passed to an alkylation zone containing a suitable highly acid catalyst such as an anhydrous solution of hydrogen fluoride. In the alkylation zone the mono-olefins react with alkylatable aromatic while the unconverted normal paraffins remain substantially unchanged. The effluent stream from the alkylation zone can then be easily separated, typically by means of a suitable fractionation system to allow recovery of the unreacted normal paraffins. The resulting stream of unconverted normal paraffins is then usually recycled to the dehydrogenation step of the present invention.

The following working examples are introduced to illustrate further the novelty, mode of operation, utility, and benefits associated with the dehydrogenation method of the present invention. These examples are intended to be illustrative rather than restrictive.

These examples are all performd in a laboratory scale dehydrogenation plant comprising a reactor, a hydrogen separating zone, a heating means, cooling means, pumping means, compressing means, and the like equipment. In this plant, the feed stream containing the dehydrogenatable hydrocarbon is combined with a hydrogen stream and the resultant mixture heated to the desired conversion temperature, which refers herein to the temperature maintained at the inlet to the reactor. The heated mixture is then passed into contact with the catalyst which is maintained as a fixed bed of catalyst particles in the reactor. The pressures reported herein are recorded at the outlet from the reactor. An effluent stream is withdrawn from the reactor, cooled, and passed into the hydrogen-separating zone wherein a hydrogen gas phase separates from a hydrocarbon-rich liquid phase containing dehydrogenated hydrocarbons, unconverted dehydrogenatable hydrocarbons, and a minor amount of side products of the dehydrogenation reaction. A portion of the hydrogen-rich gas phase is recovered as excess recycle gas with the remaining portion being continuously recycled through suitable compressive means to the heating zone as described above. The hydrocarbon-rich liquid phase from the separating zone is withdrawn therefrom and subjected to analysis to determine conversion and selectivity for the desired dehydrogenated hydrocarbon as will be indicated in the examples. Conversion numbers of the dehydrogenatable hydrocarbon reported herein are all calculated on the basis of disappearance of the dehydrogenatable hydrocarbon and are expressed in mole percent. Similarly, selectivity numbers are reported on the basis of moles of desired hydrocarbon produced per 100 moles of dehydrogenatable hydrocarbon converted.

All of the catalysts utilized in these examples are prepared according to the following generated method with suitable modification in stoichiometry to achieve the compositions reported in each example. First, an alumina carrier material comprising 1/16 inch spheres is prepared by: forming an alumina hydroxyl chloride sol by dissolving substantially pure aluminum pellets in a hydrochloric acid solution, adding hexamethylenetetramine to the sol, gelling the resulting solution by dropping it into an oil bath to form spherical particles of an alumina hydrogel, aging and washing the resulting particles with an ammoniacal solution and finally drying, calcining, and steaming the aged and washed particles to form spherical particles of gamma-alumina containing substantially less than 0.1 wt. percent combined chloride. Additional details as to this method of preparing this alumina carrier material are given in the teachings of U.S. Pat. No. 2,620,314. The resulting gamma-alumina particles are then contacted with sulfur-free aqueous impregnation solution containing chloroplatinic acid, chloroiridic acid and nitric acid in amounts sufficient to yield a final catalytic composite containing the desired amounts of platinum and iridium. The nitric acid is utilized in an amount of about 2 wt. percent of the alumina particles. The impregnated spheres are then dried at a temperature of about 250° F. for about an hour and thereafter calcined or oxidized with a substantially sulfur-free, oxygen-containing gas stream at a temperature of about 500° F. to about 1000° F. for about 2 to 10 hours. In general, it is a good practice to thereafter treat the resulting calcined particles with an air stream containing about 10 to about 30% steam at a temperature of about 1000° F. for an additional period of about 5 hours in order to reduce the residual combined chloride contained in the catalyst. The alkali or alkaline earth component is added to the oxidized and steam-treated platinum- and iridium-containing catalyst in a separate impregnation step. This second impregnation step involves contacting the oxidized particles with an aqueous solution of a suitable decomposable salt of the alkali or alkaline earth metal component. For the catalyst utilized in the present examples, the salt is either lithium nitrate or potassium nitrate. The amount of the salt of the alkali metal utilized is chosen to result in a final catalyst of the desired composition. The resulting alkali impregnated particles are then dried and oxidized with a substantially sulfur-free oxygen-stream in much the same manner as is described above following the first impregnation step.

The resulting catalyst is reduced during start-up by contacting with a dry and sulfur-free hydrogen stream at a temperature of about 1050° F. for 1 hour at a gas hourly space velocity of about 500 hr.$^{-1}$.

EXAMPLE I

The reactor is loaded with 100 cc. of a catalyst containing, on an elemental basis, 0.375 wt. percent platinum, 0.375 wt. percent iridium, 0.6 wt. percent lithium and less than 0.15 wt. percent chloride. The feed stream utilized is commercial grade isobutane containing 99.7 wt. percent isobutane and 0.3 wt. percent normal butane. The feed stream is contacted with the catalyst at a temperature of 1065° F., a pressure of 10 p.s.i.g, a liquid hourly space velocity of 4.0 hr.$^{-1}$, and a hydrogen to hydrocarbon mole ratio of 2:1. The dehydrogenation plant is lined-out at these conditions and a 20 hour test period commenced The hydrocarbon product stream from the plant is continuously analyzed by GLC (gas liquid chromatography) and a high conversion of isobutane is observed with a high selectivity for isobutylene.

EXAMPLE II

The catalyst contains, on an elemental basis, 0.25 wt. percent platinum, 0.25 wt. percent iridium, 0.6 wt. percent lithium, and less than 0.15 wt. percent combined chloride. The feed stream is commercial grade normal dodecane. The dehydrogenation reactor is operated at a temperature of 870° F., a pressure of 10 p.s.i.g., a liquid hourly space velocity of 32 hr.$^{-1}$, and a hydrogen to hydrocarbon mole ratio of 8:1. After a line-out period a 20 hour test period is performed during which the average conversion of the normal dodecane is maintained at a high level with a selectivity for normal dodecene of about 90%.

EXAMPLE III

The catalyst is the same as utilized in Example II. The feed stream is normal tetradecane. The conditions utilized are a temperature of 840° F., a pressure of 20 p.s.i.g., a liquid hourly space velocity of 32 hr.$^{-1}$, and a hydrogen to hydrocarbon mole ratio of 8:1. After a line-out period, a 20 hours test shows an average conversion of about 12%, and a selectivity for normal tetradecene of about 90%.

EXAMPLE IV

The catalyst contains, on an elemental basis, 0.3 wt. percent platinum, 0.3 wt. percent iridium, and 0.6 wt. percent lithium, with combined chloride being less than 0.2 wt. percent. The feed stream is substantially pure normal butane. The conditions utilized are a temperature of 950° F., a pressure of 15 p.s.i.g., a liquid hourly space velocity of 4.0 hr.$^{-1}$ and a hydrogen to hydrocarbon mole ratio of 4:1. After a line-out period, a 20 hour test is performed with an average conversion of the normal butane being about 30% and the selectivity for normal butene is about 80%.

EXAMPLE V

The catalyst contains, on an elemental basis, 0.375 wt. percent platinum, 0.375 wt. percent iridium, 1.5 wt. percent potassium, and less than 0.2 wt. percent combined chloride. The feed stream is commercial grade ethylbenzene. The conditions utilized are a pressure of 15 p.s.i.g., a liquid hourly space velocity of 32 hr.$^{-1}$, a temperature of 1050° F., and a hydrogen to hydrocarbon mole ratio of 8:1. During a 20 hour test period, 85% or more of equilibrium conversion of the ethylbenzene is observed. The selectivity for styrene is about 95%.

It is intended to cover by the following claims, all changes and modifications of the above disclosure of the present invention which would be self-evident to a man of ordinary skill in the catalyst-formation art or in the hydrocarbon dehydrogenation art.

I claim as my invention:

1. A method for dehydrogenating a dehydrogenatable hydrocarbon comprising contacting the hydrocarbon at dehydrogenation conditions with the catalytic composite comprising a combination of catalytically effective amounts of a platinum component, an iridium component, an alkali or alkaline earth metal component and a sulfur component with a porous carrier material, wherein the platinum and iridium components are uniformly dispersed in the carrier material, wherein the platinum and iridium components are present in amounts selected to result in an atomic ratio of iridium to platinum of about 0.5:1 to about 1.5:1, wherein the sulfur is present in an amount of about 0.05 to about 0.5 wt. percent sulfur calculated on an elemental basis, and wherein the composite is prepared by the steps of:
   (a) forming a sulfur-free composite of platinum, iridium and an alkali or alkaline earth metal with a porous carrier material in a manner selected to result in a uniform dispersion of the iridium and platinum components in the carrier material;
   (b) subjecting the resulting composite to contact with a sulfur-free, oxygen-containing gas stream at oxidation conditions selected to oxidize both the platinum and iridium components;
   (c) contacting the resulting oxidized composite with a sulfur-free hydrogen stream at reduction conditions selected to reduce both the platinum and iridium components to the elemental metallic state; and thereafter,
   (d) presulfiding the resulting composite to incorporate in therein from about 0.05 to about 0.5 wt. percent sulfur, calculated on an elemental basis.

2. A method as defined as in claim 1 wherein the dehydrogenatable hydrocarbon is admixed with hydrogen when it contacts the catalytic composite.

3. A method as defined in claim 1 wherein the dehydrogenatable hydrocarbon is an aliphatic compound containing 2 to 30 atoms per molecule.

4. A method as defined in claim 1 wherein the dehydrogenatable hydrocarbon is a normal paraffin hydrocarbon containing about 4 to 30 carbon atoms per molecule.

5. A method as defined in claim 1 wherein the dehydrogenatable hydrocarbon is an alkylaromatic, the alkyl group of which contains 2 to 6 carbon atoms.

6. A method as defined in claim 1 wherein the dehydrogenatable hydrocarbon is a naphthene.

7. A method as defined in claim 2 wherein the dehydrogenation conditions include a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to about 20:1.

8. A method as defined in claim 1 wherein the dehydrogenatable hydrocarbon is a normal paraffin hydrocarbon containing about 10 to about 18 carbon atoms per molecule.

References Cited
UNITED STATES PATENTS
3,696,167  10/1972  Juquin et al. _____ 260—683.3

CURTIS R. DAVIS, Primary Examiner

U.S. Cl. X.R.
260—669 R, 680 R, 683.3